United States Patent [19]

Mori et al.

[11] Patent Number: 5,418,630
[45] Date of Patent: May 23, 1995

[54] FACSIMILE APPARATUS

[75] Inventors: Hiroshi Mori, Ichikawa; Matahira Kotani, Nara; Motohiko Hayashi, Yamatokoriyama; Masayuki Hachinoda, Nara, all of Japan

[73] Assignee: Sharp Kabushiki Kaisha, Osaka, Japan

[21] Appl. No.: 946,672

[22] Filed: Sep. 18, 1992

[30] Foreign Application Priority Data

Sep. 18, 1991 [JP] Japan .................................. 3-238290
Sep. 18, 1991 [JP] Japan .................................. 3-238291

[51] Int. Cl.⁶ ............................................. H04N 1/00
[52] U.S. Cl. .................................. 358/472; 358/473; 358/484; 359/152
[58] Field of Search ............... 358/400, 401, 402, 405, 358/409, 410, 442, 473, 474, 476, 479, 484, 472; 359/109, 152, 154

[56] References Cited

U.S. PATENT DOCUMENTS 3,592,963  7/1971  Young .
3,911,206 10/1975  Nasu .
4,415,065 11/1983  Sandstedt .
4,547,810 10/1985  Rutherford et al. .
5,041,917  8/1991  Koshiishi .
5,172,243 12/1992  Hayashi et al. .

FOREIGN PATENT DOCUMENTS 2-76458    3/1990  Japan .
2-146856   6/1990  Japan .
2-274061  11/1990  Japan .
3-160874   7/1991  Japan .
3-169151   7/1991  Japan .

*Primary Examiner*—Bentsu Ro

[57] ABSTRACT

A facsimile apparatus is provided which can enhance the operability and usefulness of portable image reading devices when transmitting documents and which allows effective utilization of the image reading device. The facsimile apparatus includes a main unit and a separable handscanner between which image signals and various control signals are transmitted using an optical communication technique. A document is scanned by a handscanner that generates signals representing the document image. The image signals are temporarily stored in an image memory and transmitted to the main unit when necessary. Depending on the hook state of the telephone, the main unit either transmits the received image signals to a remote station or records the image on recording paper. When the main unit receives image signals over a telephone network, the received image signals are transmitted to the handscanner for storage into the image memory when necessary. This is done for example, when the so-called memory reception mode is set or when a recording section in the main unit is in a non-normal state.

15 Claims, 11 Drawing Sheets

FACSIMILE APPARATUS

BACKGROUND OF THE INVENTION

1. Field of the Invention

The present invention relates to a facsimile apparatus which includes a comparatively small portable image reading device generally known as a handscanner and which is capable of transmitting image signals read by the image reading device to a remote facsimile apparatus or printing out the image represented by the image signals on recording paper.

2. Description of the Related Art

Conventionally, facsimile apparatuses are equipped with an image reader internal to the apparatuses. Such conventional facsimile apparatus can only handle single-sheet documents (documents in single-sheet form) but cannot directly handle bound documents such as a book. Therefore, before transmission of bound documents, the documents have to be copied on a copying machine to produce copies that can be handled by the facsimile apparatus, a procedure which is time consuming and troublesome. To overcome such difficulty, recently developed facsimile apparatuses are equipped with a comparatively small portable image reading device generally known as a handscanner. This provides the useful feature that bound documents can be directly read into the facsimile apparatus.

In the handscanner-equipped facsimile apparatus, the image signals of the original documents read by the handscanner are first stored in an image memory internal to the facsimile apparatus. Then, in accordance with the operation performed by the operator, the image signals are transmitted to a remote facsimile apparatus or a duplicate image is printed out on recording paper. In such an apparatus, the handscanner and the facsimile apparatus are electrically interconnected with a cable for transmission of image signals. Therefore, the image reading by the handscanner can only be performed within the range limited by the length of the cable, i.e. within the reach of the cable leading from the facsimile apparatus. For example, when a book is to be read by the handscanner for transmission by the facsimile apparatus, if the book is in a room other than the room where the facsimile apparatus is installed, one has to go to the trouble of taking the book to the room where the facsimile apparatus is installed.

Furthermore, conventional facsimile apparatuses are usually equipped with an image memory for temporarily storing a received image signal, when the recording paper has run out, until the facsimile apparatus is loaded with a new recording paper. The image memory capacity, however, is limited to, for example, 40 pages of standard A-4 size (297 mm×210 mm) documents, and it may not be possible to receive all the image signals depending on the amount of documents. Increasing the image memory capacity would involve increasing the size of the apparatus.

SUMMARY OF THE INVENTION

It is an object of the invention to provide a facsimile apparatus which can enhance the operability and usefulness of a portable image reading device when transmitting documents and which allows effective utilization of the image reading device.

The objects of the present application are fulfilled by providing a facsimile apparatus comprising:

a main unit having first image reading means for optically reading a document image for conversion into image signals, image recording means for printing out document images on recording paper, and image signal communication means for transmitting and receiving image signals over a telephone network; and second image reading means for optically reading a document image for conversion into image signals, the second image reading means being portable, wherein the second image reading means comprising:

an image memory for storing the image signals; and first communication means for transmitting the image signals to the main unit via a wireless path, and the main unit comprising:

second communication means for receiving the image signals from the second image reading means;

matching signal detecting means for detecting a prescribed matching signal received from a remote terminal over the telephone network; and control means for transferring the image signals received by the second communication means to the image signal communication means when the matching signal is detected by the matching signal detecting means.

The invention also provides a facsimile apparatus comprising:

a main unit having first image reading means for optically reading a document image for conversion into image signals, image recording means for printing out document images on recording paper, and image signal communication means for transmitting and receiving image signals over a telephone network; and second image reading means for optically reading a document image for conversion into image signals, the second image reading means being portable, wherein the second image reading means comprising:

an image memory for storing the image signals; and first communication means for transmitting the image signals to the main unit via a wireless path, and the main network comprising:

second communication means for receiving the image signals from the second image reading means;

telephone number storage means for storing a plurality of remote terminal telephone numbers;

broadcast designating means for designating multi-address calling for sequentially transmitting the same image signal to a plurality of remote terminals; and control means for sequentially calling the telephone numbers read out of the telephone number storage means in response to the designating means and for transferring the image signals received by the second communication means to the image signal communication means for multi-address calling.

In one preferred mode of the invention, the main unit further includes: an external telephone; signal detecting means for detecting a pushbutton dial signal or dial pulse signal from the external telephone; and telephone number registration means for writing an entered telephone number to the telephone number storage means in accordance with the output of the signal detecting means.

According to the invention, the second image reading device reads a document image and stores the read image signals in the image memory provided therein, the stored image signals being subsequently transmitted to the main unit via a wireless path. When a prescribed matching signal, transmitted from a remote terminal, is detected by the matching signal detecting device, the main unit transfers the image signals received by the second communication device to the image signal communication device for transmission to the remote terminal (facsimile apparatus).

Also, according to the invention, the second image reading device reads a document image and stores the read image signals in the image memory stored therein, the stored image signals being subsequently transmitted to the main unit via a wireless path. In the main unit, when multi-address calling is designated by the designating device, the control device sequentially calls the telephone numbers read out of the telephone number storage device and transfers the image signals received by the second communication device to the image signal communication device at each telephone number call for transmission to the called facsimile terminal, thereby performing the designated multi-address calling.

Furthermore, according to the invention, the main unit includes signal detecting device for detecting a pushbutton dial signal or dial pulse signal from the external telephone, and the telephone number detected by the signal detecting device, i.e. the telephone number entered from the external telephone, is written to the telephone number storage device by the telephone number registration device. Thus, the registration of telephone numbers in the telephone number storage device can be made from the external telephone.

As described, according to the invention, when a prescribed matching signal, transmitted from a remote terminal, is detected by the matching signal detecting device, the image signals received by the second communication device are transferred to the image signal communication device for transmission to the remote terminal (facsimile apparatus), thus allowing so-called memory transmission by utilizing the image memory provided in the second image reading device. This serves to enhance the usefulness of the facsimile apparatus and expand the range of its applications.

Also, according to the invention, when multi-address calling is designated by the designating device, the control device sequentially calls the telephone numbers read out of the telephone number storage device and transfers the image signals received by the second communication device to the image signal communication device at each called telephone number for transmission to the called facsimile terminal, thereby performing the designated multi-address calling. The image memory provided in the second image reading device is thus utilized for multi-address calling, thus further enhancing the usefulness of the facsimile apparatus and expanding the range of its applications.

Furthermore, according to the invention, telephone numbers entered from the external telephone are written to the telephone number storage device by the telephone number registration device. Thus, registration of telephone numbers in the telephone number storage device can be made from the external telephone. Therefore, the main unit need not be provided with numeric keys for registration of telephone numbers, which serves to simplify the configuration and reduce the size of the main unit.

The invention provides a facsimile apparatus comprising:
a main unit having first image reading means for optically reading a document image for conversion into image signals, image recording means for printing out document images on recording paper, and image signal communication means for transmitting and receiving image signals over a telephone network; and
second image reading means for optically reading a document image for conversion into image signals, the second image reading device being portable, wherein
the second image reading means comprising:
an image memory for storing the image signals; and
first communication means for transmitting the image signals to the main unit via a wireless path, and
the main unit comprising:
second communication means for receiving the image signals from the second image reading means;
control device for transferring the image signals received by the second communication means to the image recording means or to the image signal communication means.

in one preferred mode of the invention, the first communication device of the second image reading device has a receive function for receiving image signals from the main unit. Further, the second communication device of the main unit has a transmit function for transmitting image signals to the second image reading device, and the control device transmits the image signals, received through the image signal communication device, to the second reading device for storing into the image memory when a predetermined condition is satisfied.

In another preferred mode of the invention, the main unit includes a telephone section having a handset, and a hook state detecting device for detecting whether the handset is in the on-hook or off-hook state. The control device transfers the image signals from the second image reading device to the image recording device when the handset is in the on-hook state, and to the image signal communication device when it is in the off-hook state.

In a preferred mode of the invention, signal transmission between the first and second communication device is performed by using the technique of light modulation.

In another preferred mode of the invention, signal transmission between the first and second communication device is performed by using the technique of photoelectric conversion.

According to the invention, the second image reading device reads a document image and stores the read image signals in the image memory, the stored image signals being subsequently transmitted to the main unit via a wireless path. The main unit transfers the received image signals to the image recording device to produce a duplicate image of the original document, or to the image signal communication device for transmission to a remote facsimile terminal.

Also, according to the invention, when a predetermined condition is satisfied, the image signals received through the image signal communication device are transmitted to the second image reading device which then stores the thus transmitted image signals in the image memory. The predetermined condition includes, for example, the norecording-paper condition in the image recording device or the designation of memory reception for high speed reception.

Furthermore, according to the invention, the main unit includes a telephone section having a handset, and the hook state detecting device detects the hook state of the handset. When the handset is in the on-hook state, that is, when the main unit is not connected to the telephone network, image signals received are transferred to the image recording device to produce a duplicate image on recording paper. On the other hand, when the handset is in the off-hook state, that is, when the main unit is connected to the telephone network over which a call is established, the image signals received are transferred to the image signal communication device for transmission to a remote facsimile terminal.

According to the invention, signal transmission between the main unit and the second image reading device is performed by using the technique of light modulation. Therefore, compared with a radio transmission method using electric waves, the configuration of the communication device can be simplified, and hence, the main unit and the second image reading device can be reduced in size and weight.

Furthermore, according to the invention, signal transmission between the main unit and the second image reading device is performed by using the technique of photoelectric conversion. Therefore, compared with a radio transmission method using electric waves, the configuration of the communication device can be simplified, and hence, the main unit and the second image reading means can be reduced in size and weight. Furthermore, compared with the above light modulation method, the transmission range becomes shorter, but the configuration can be further simplified, and hence, the cost can be reduced as well as the size and weight.

As described, according to the invention, the second image reading means reads a document image and stores the read image signals in the image memory, the stored image signals being subsequently transmitted to the main unit via a wireless path. The main unit transfers the received image signals to the image recording means to produce a duplicate image of the original document, or to the image signal communication device for transmission to a remote facsimile terminal. Thus, the second image reading means can be used independently of the main unit, i.e., without being limited by an interconnecting cable as was the case with conventional apparatus. This serves to enhance the usefulness of the facsimile apparatus and expand the range of its applications.

Also, according to the invention, when a predetermined condition is satisfied, the image signals received through the image signal communication means are transmitted to the second image reading means which then stores the thus transmitted image signals in the image memory. The predetermined condition includes, for example, the no-recording-paper condition in the image recording device or the designation of memory reception for high speed reception. This serves to expand the functions of the facsimile apparatus.

Furthermore, according to the invention, when the handset is in the on-hook state, that is, when the main unit is not connected to the telephone network, image signals received are transferred to the image recording device to produce a duplicate image on recording paper. On the other hand, when the handset is in the off-hook state, that is, when the main unit is connected to the telephone network over which a call is established, the image signals received are transferred to the image signal communication device for transmission to a remote facsimile terminal. In this manner, the image signals transmitted from the second image reading device are automatically handled according to the hook state of the handset, contributing to a significant increase in the operability of the facsimile apparatus.

According to the invention, since signal transmission between the main unit and the second image reading device is performed by using the technique of light modulation, the configuration of the communication device can be simplified, as compared with a radio transmission method using electric waves. Thus, the main unit and the second image reading device can be reduced in size and weight.

Furthermore, according to the invention, since signal transmission between the main unit and the second image reading device is performed by using the technique of photoelectric conversion, the configuration of the communication device can be simplified, as compared with a radio transmission method using electric waves. Thus, the main unit and the second image reading device can be reduced in size and weight. Furthermore, compared with the above light modulation method, the transmission range becomes shorter, but the configuration can be further simplified, and hence, the cost can be reduced as well as the size and weight.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be more fully understood from the following detailed description and accompanying drawings which are given by way of illustration only, and thus are not limitative of the present invention and wherein.

DETAILED DESCRIPTION OF THE PREFERRED EMBODIMENTS

Figure 1:
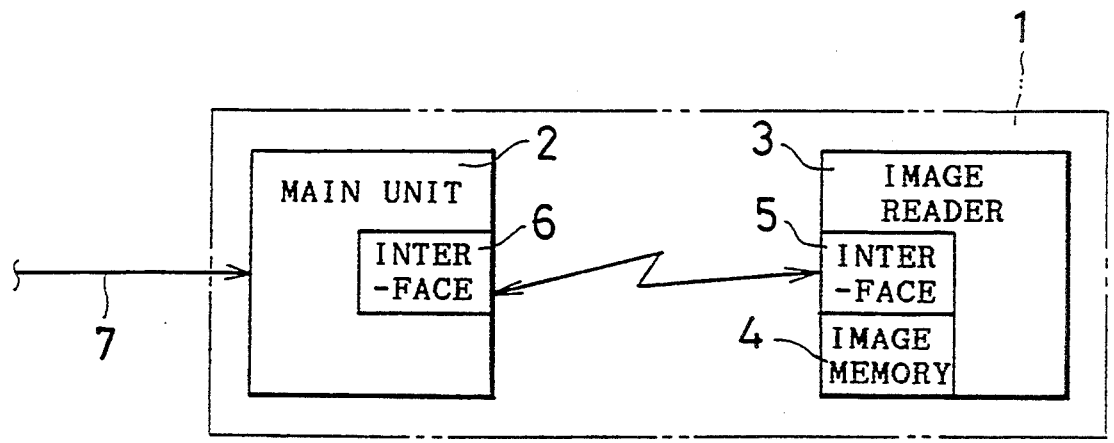
FIG. 1 is a block diagram showing the basic configuration of a facsimile apparatus 1 according to one embodiment of the invention.

Now referring to the drawings, preferred embodiments of the invention are described below.

FIG. 1 is a block diagram showing an outline configuration of a facsimile apparatus 1 according to one embodiment of the invention. The facsimile apparatus 1 comprises a main unit 2 and a comparatively small portable image reading device (hereinafter also referred to as a handscanner) 3. The main unit 2 is connected to a telephone network 7 and is installed in predetermined place. The handscanner 3 is separable from the main unit 2 and includes an image memory 4 for storing image signals of a document image read by the scanner or image signals transferred from the main unit 2. The handscanner 3 also includes an interface 5 for transferring image signals and various control signals to and from an interface 6 in the main unit 2. Interconnection between the main unit 2 and the handscanner 3 is cordless, as commonly called, and is accomplished by one of a radio or an optical communication method, for example. In the embodiment described herein, an optical communication method is employed for the interconnection.

Figure 2:
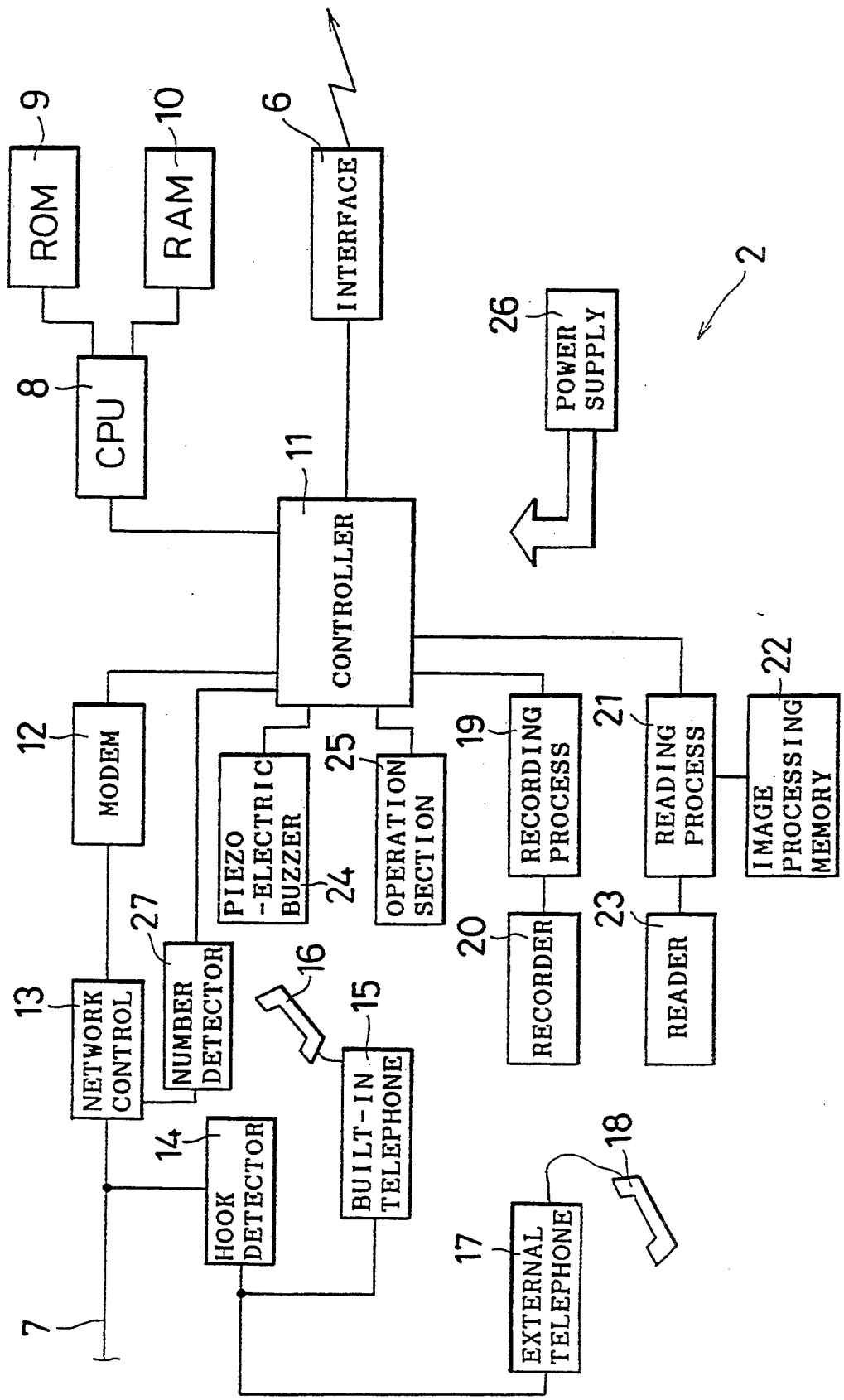
FIG. 2 is a block diagram showing the basic configuration of a main unit 2 of the facsimile apparatus 1.

FIG. 2 is a block diagram showing the basic configuration of the main unit 2. The main unit 2 includes a central processing unit (CPU) 8 to which are connected a read-only memory (ROM) 9, a random-access memory (RAM) 10, and a controller 11. The ROM 9 contains various programs and parameters for controlling the entire operation of the main unit 2, while the RAM 10 includes such areas as a work area used during program execution, a parameter storage area for storing various control data, a telephone number storage area for storing remote terminal telephone numbers for multi-address calling described hereinafter, and a password storage area for storing passwords that are referenced at the time of polling hereinafter described. The CPU 8 loads programs from the ROM 9 for execution and controls the operation of the main unit 2 through the controller 11.

Connected to the controller 11 is the interface 6 for transferring image signals and various control signals to and from the handscanner 3. Also connected to the controller 11 is a modem 12 for modulating and demodulating image data, and to the modem 12 is connected a network control unit 13. The network control unit 13 connects the telephone network 7 with the modem 12 or with a telephone section hereinafter described. Also connected to the network control unit 13 is a hook detection circuit 14 to which a built-in telephone 15 and an external telephone 17 are connected. The built-in telephone 15 and the external telephone 17 are provided with a handset 16 or 18, and the hook state of each of the handsets 16 and 18 is detected by the hook detection circuit 14, and the detected signal is fed to the controller 11.

Also connected to the network control unit 13 is a number detection circuit 27 for detecting a dial pulse signal or a pushbutton dial signal from the telephone. The detected number is supplied to the controller 11.

There is connected to the controller 11 a recording processor 19 which transfers image signals, received via the modem 12, to a recording section 20 for printing on a recording paper. Also connected to the controller 11 is a reading processor 21 which converts a document image, read by a reading section 23, into image signals which are, for example, binary-coded using an image processing memory 22. These signals are transferred to the controller 11 from which they are transmitted to a remote terminal over the telephone network 7 or to the handscanner 3 via the interface 6.

Furthermore, the controller 11 is connected to: a piezoelectric buzzer 24 for notifying error occurrence to the user; and an operation section 25 having a plurality of key switches for setting various functions of the main unit 2 and for directing the initiation of their operations. The operation section 25 includes memory keys and quick dial keys hereinafter described. Power is supplied to the main unit 2 from a power supply circuit 26.

Figure 3:
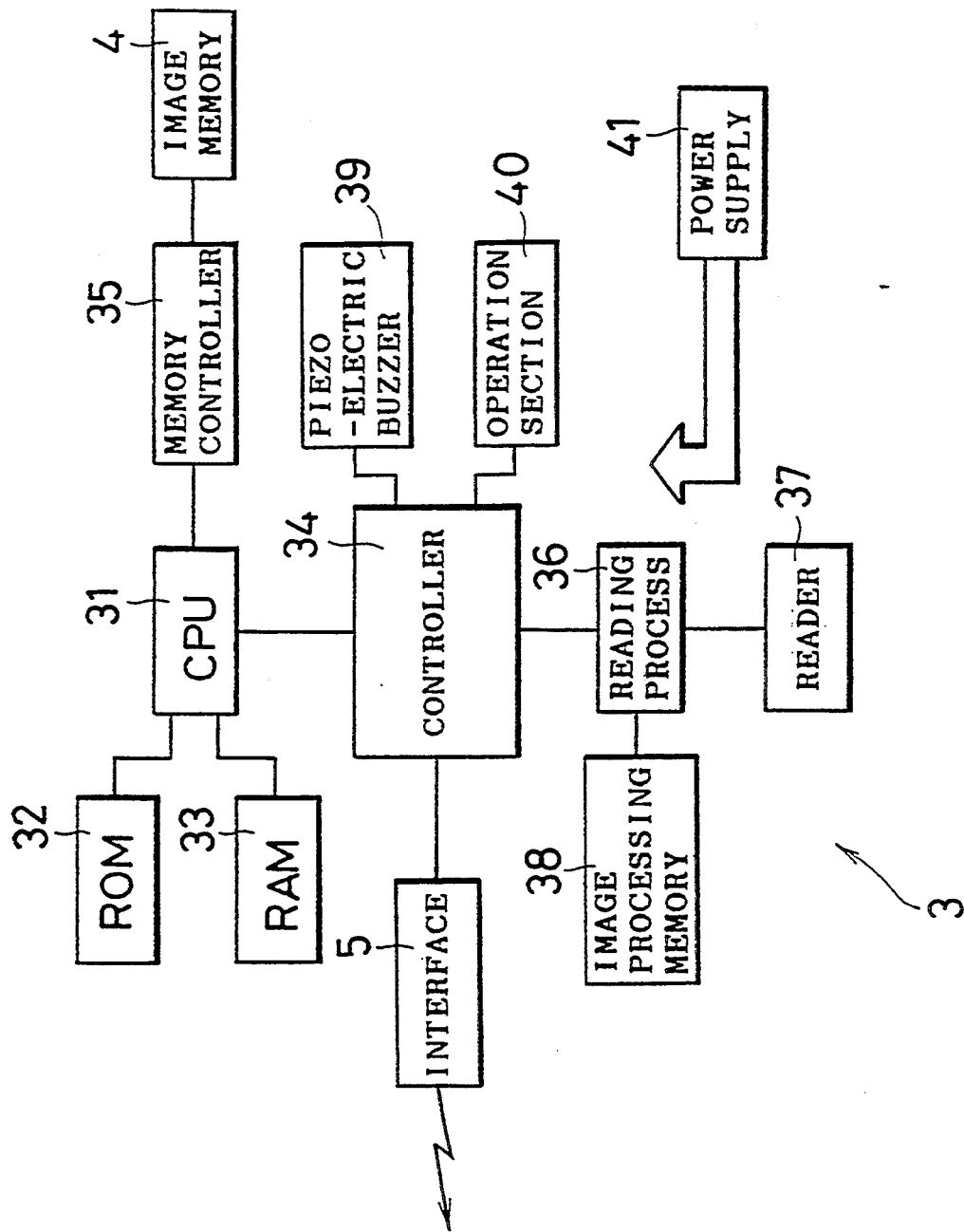
FIG. 3 is a block diagram showing the basic configuration of a handscanner 3 of the facsimile apparatus 1.

FIG. 3 is a block diagram showing the basic configuration of the handscanner 3. The handscanner 3 includes a CPU 31 to which are connected a ROM 32, a RAM 33, a controller 34, and a memory controller 35. The ROM 32 contains various programs and parameters for controlling the operation of the handscanner 3, while the RAM 33 includes such areas as a work area used during program execution and a storage area for storing various control data. The CPU 31 loads programs from the ROM 32 for execution and controls the controller 34 and the memory controller 35.

Connected to the controller 34 is the interface 5 for transferring image signals and various control signals to and from the main unit 2. Also connected to the controller 34 is a reading processor 36 which converts a document image, read by a reading section 37, into image signals which are, for example, binary-coded using an image processing memory 38. These signals are transferred to the controller 34 from which they are transmitted to the main unit 2 via the interface 5 or fed to the image memory 4 through the memory controller 35.

Furthermore, the controller 34 is connected to: a piezoelectric buzzer 39 for notifying error occurrence to the operator of the handscanner 3; and an operation section 40 having various key switches for setting the operating conditions of the handscanner 3. Power to drive the handscanner 3 is supplied from a power supply circuit 41 which is implemented as a battery or the like.

Figure 4:
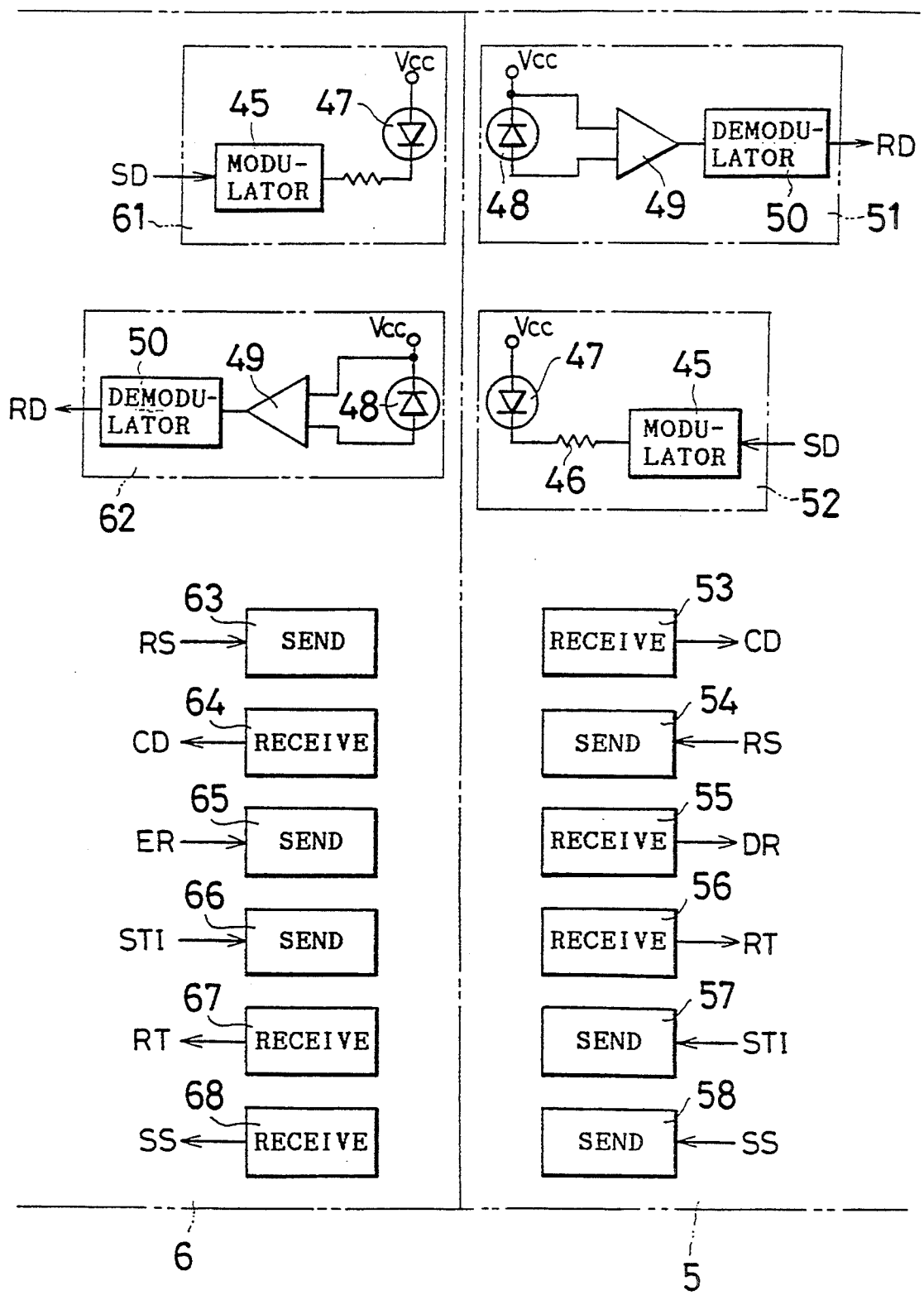
FIG. 4 is a block diagram showing one configuration of interfaces 5 and 6 respectively incorporated in the main unit 2 and the handscanner 3.

FIG. 4 is a block diagram showing the basic configuration of the interfaces 5 and 6. The interfaces 5 and 6 each comprise a pair of transmitting and receiving units 51–58 or 61–68. In this embodiment, eight kinds of signals (including image signals) are transferred between the interfaces 5 and 6 by using the technique of light modulation. Table 1 below shows the eight kinds of signals.

TABLE 1

| No. | Function | Signal name | Direction | Signal name | Function |
|---|---|---|---|---|---|
| 1 | Send data | SD | → | RD | Receive data |
| 2 | Send data enable | RS | → | CD | Receive data enable |
| 3 | Receive data | RD | ← | SD | Send data |
| 4 | Receive data enable | CD | ← | RS | Send data enable |
| 5 | Terminal ready | ER | → | DR | Data set ready |
| 6 | Send timing signal | STI | → | RT | Receive timing signal |
| 7 | Receive timing signal | RT | ← | STI | Send timing signal |
| 8 | Scanner set | SS | ← | SS | Scanner set |

TABLE 1-continued

| No. | Function signal | Signal name | Direction | Signal name | Function signal |
|-----|----------|-------------|-----------|-------------|----------|

The configurations of the transmitting unit and receiving unit are the same between the interfaces 5 and 6, and therefore, the following description deals with the transmitting unit 51 and the receiving unit 61. The send data SD supplied from the controller 11 is modulated by a modulation circuit 45 and applied to the cathode of a light-emitting diode 47 via a resistor 46. A constant voltage Vcc is applied to the anode of the light-emitting diode 47. The light emitted from the light-emitting diode 47 is received by a light-receiving element 48, demodulated by a demodulation circuit 50, and supplied as receive data RD to the controller 34 of the handscanner 3.

Likewise, the send data SD supplied from the controller 34 of the handscanner 3 is transmitted by the transmitting unit 52, received by the receiving unit 62, and supplied as receive data RD to the controller 11 of the main unit 2. The transmitting unit 52 is identical in configuration to the transmitting unit 61, and the receiving unit 62 is identical in configuration to the receiving unit 51. Transmission of the other signals is also performed between the interfaces 5 and 6 in the same manner as described above.

Figure 5:
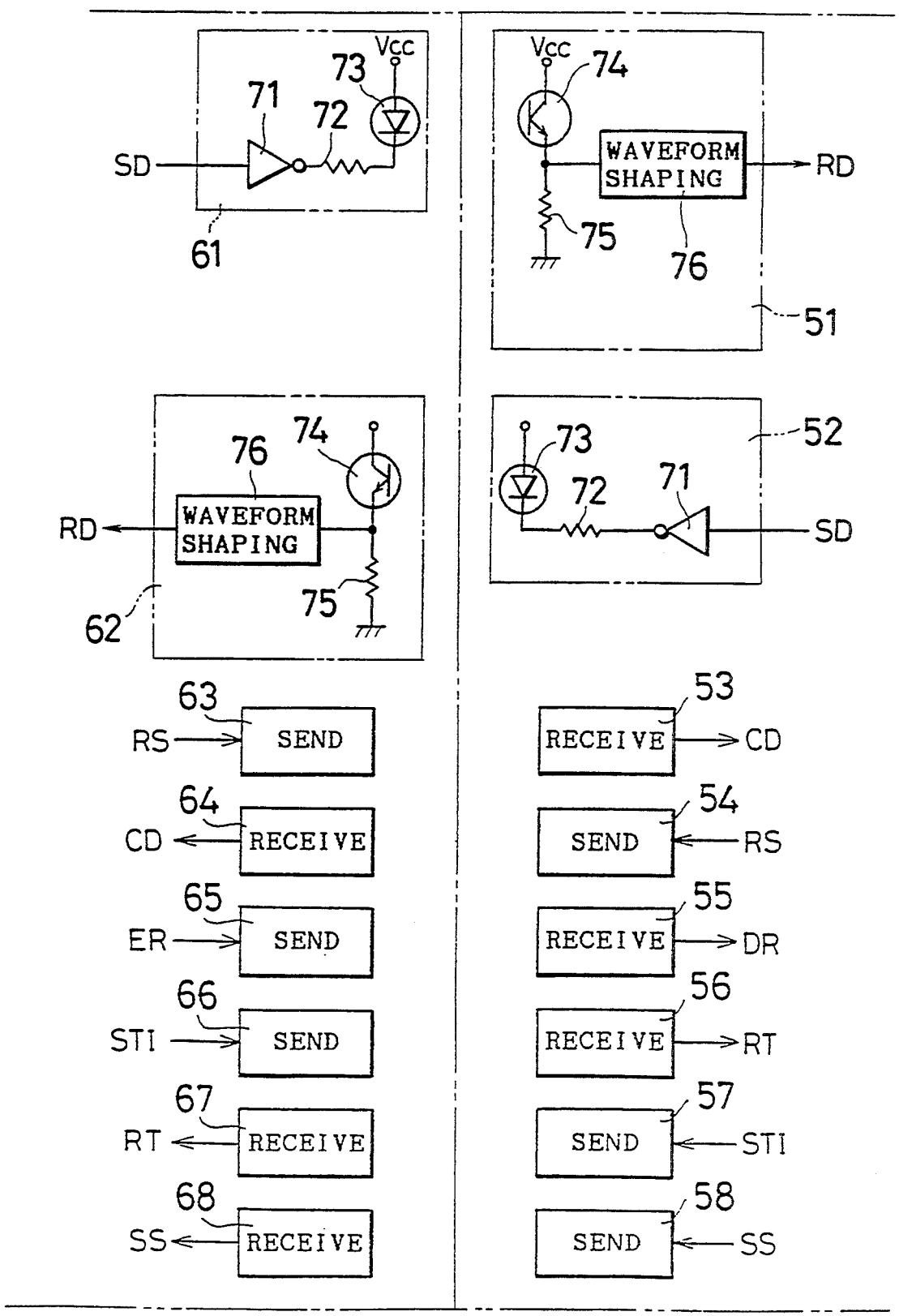
FIG. 5 is a block diagram showing an another configuration of the interfaces 5 and 6.

FIG. 5 is a block diagram showing an another configuration of the interfaces 5 and 6. In the configuration shown in FIG. 5, signals are transferred between the interfaces 5 and 6 by using the technique of photoelectric conversion. In FIG. 5, the reference numerals designating corresponding parts are the same as those in FIG. 4. FIG. 5 is different from FIG. 4 in the configurations of the receiving unit and transmitting unit; otherwise. the configuration and operation of FIG. 5 are the same as those of FIG. 4.

In FIG. 5, the configurations of the receiving unit and transmitting unit are the same between the interfaces 5 and 6, and therefore, the following description deals with the receiving unit 51 and the transmitting unit 61. The send signal SD supplied from the controller 11 of the main unit 2 is applied to the cathode of a light-emitting diode 73 via a drive circuit 71 and a resistor 72. A constant voltage Vcc is applied to the anode of the light-emitting diode 73. The light emitted from the light-emitting diode 73 is directed to the base of a phototransistor 74. A constant voltage Vcc is applied to the collector of the phototransistor 74, the emitter of which is grounded via a resistor 75. Connected to the node between the phototransistor 74 and the resistor 75 is a waveform shaping circuit 76, the output of which is supplied as receive data RD to the controller 34 of the handscanner 3.

Likewise, when transmitting image data from the handscanner 3, the send data SD is transmitted from the transmitting unit 52 to the receiving unit 62, and the receive data RD is transferred to the controller 11 of the main unit 2. The transmitting unit 52 is identical in configuration to the transmitting unit 61, and the receiving unit 62 is identical in configuration to the receiving unit 51. Transmission of the other signals between the interfaces 5 and 6 is also performed in the same manner as above by means of the paired transmitting unit and receiving unit.

Table 2 below shows various operation modes of the facsimile apparatus 1.

TABLE 2

| Operation mode | Main unit 2 | | | | Handscanner 3 | | |
|---|---|---|---|---|---|---|---|
| | Document | Recording paper | Hook SW | Start key | Memory | Start key | Description of operation |
| 1 | — | — | — | — | | | Same as conventional FAX |
| 2 | — | — | — | ON | — | | Same as conventional FAX |
| 3 | — | ○ | ON | | ○ | ON | Print (copy) contents of handscanner |
| 4 | — | X | ON | | ○ | ON | Error, buzzer processing, and alarm lamp (Main unit 2) |
| 5 | — | ○ | ON | | X | ON | Temporarity blink alarm lamp on scanner |
| 6 | — | X | ON | | X | ON | Temporarity blink alarm lamp on scanner |
| 7 | — | — | OFF | | ○ | ON | Send contents of handscanner |
| 8 | — | — | OFF | | X | ON | Temporarily blink alarm lamp on scanner |

Figure 6:
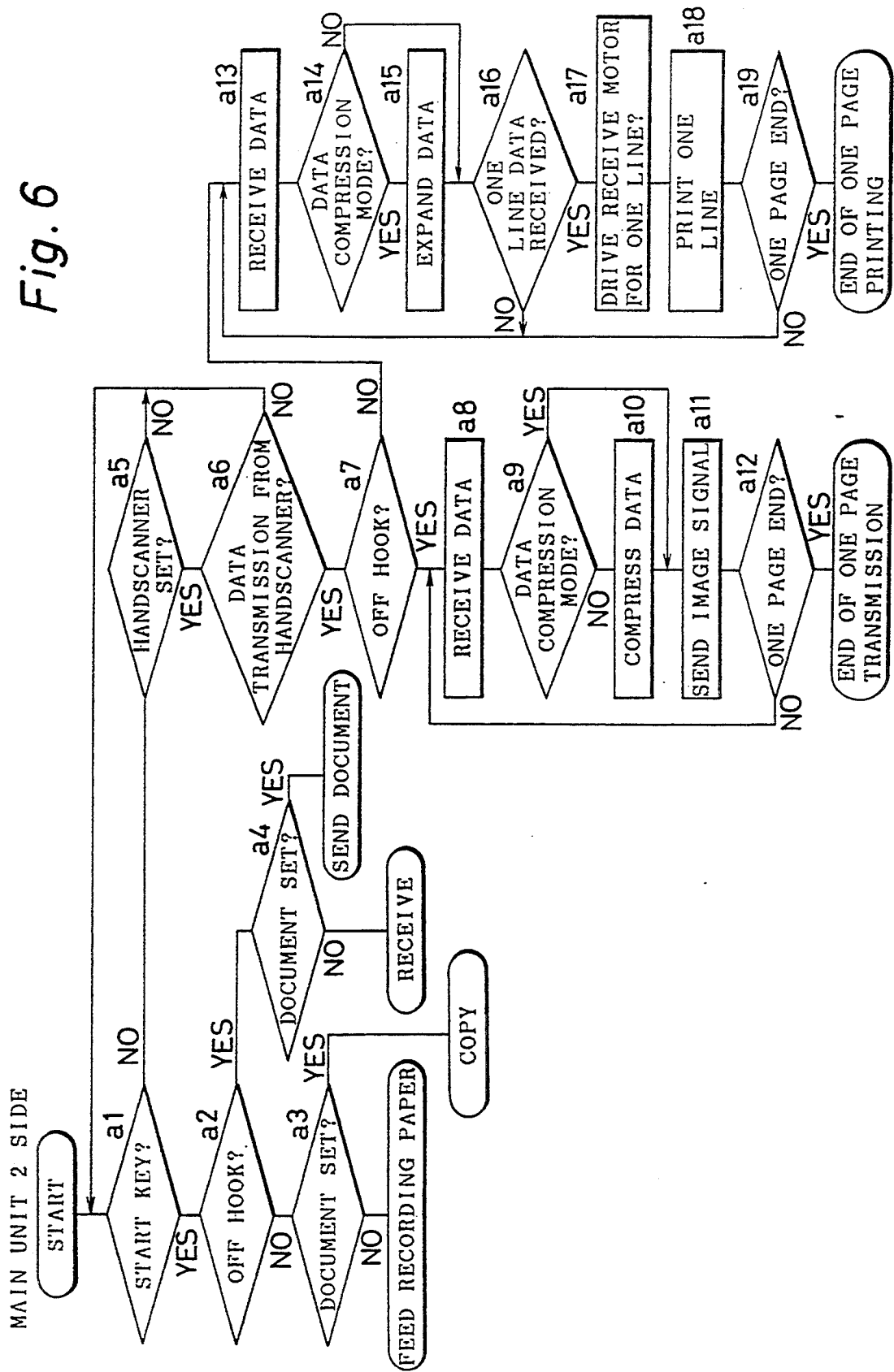
FIG. 6 is a flowchart explaining the operation of the main unit 2.

FIG. 6 is a flowchart explaining the operation of the main unit 2. In step a1, it is determined whether the start key on the operation section 25 of the main unit 1 has been depressed. If the start key is depressed, the operation proceeds to step a2 if not, the operation proceeds to step a5.

In step a2, it is determined whether or not the handset 16 or 18, is in the off-hook state. If it is not in the off-hook state, that is, if it is in the on-hook state, the operation proceeds to step a3. If it is in the off-hook state, the operation proceeds to step a4.

In step a3, it is determined whether a document is set in the reading section 23. If no document is set, a recording paper feeding operation is performed whereby the recording paper is fed by a predetermined length. If a document is set, the document is scanned and the scanned document image is printed or copied on the recording paper.

In step a4, if the handset 16 or 18 is in the off-hook state with a document set in the reading section 23, the document is transmitted. On the other hand, if the handset 16 or 18 is in the off-hook state with no document set, image data from a remote station is received. The received data is printed out on the recording paper or stored in the image memory 4 in accordance with the procedure hereinafter described.

In step a5, decision is made whether the handscanner 3 is set for the main unit 2. The decision is made, based on whether the scanner set signal SS has been received or not. The term "set" used herein does not mean physical contact but means that the interfaces 5 and 6 are enabled for transmission and reception of image data and various control signals. If the handscanner 3 is set, the operation proceeds to step a6; if not, the operation returns to step a1.

In step a6, it is determined whether there is data transmission from the handscanner 3. If there is data transmission, the operation proceeds to step a7; if not, the operation returns to step a1.

In step a7, it is determined whether or not the handset 16 or 18, is in the off-hook state. If it is in the off-hook state, i.e. for communication with a remote station, the operation proceeds to step a8. If it is not in the off-hook state, that is, if it is in the on-hook state, the operation proceeds to step a13.

In step a8, image data is received from the handscanner 3. In step a9, it is determined whether the received image data is in data compression mode or not. If it is not in data compression mode, data compression is performed in step a10 before proceeding to step a11. If the data is in data compression mode, the operation jumps to step a11.

In step a11, the image signals received from handscanner 3 are transmitted to the remote station with which a call has been established. In step a12, a decision is made whether transmission of the image signals for one page has been completed or not. If not, the operation returns to step a8 to continue transmission of the image signals. When transmission of the image signals for one page is completed, the transmitting operation is temporarily suspended, and if there are image signals to be transmitted for the next page, the operation returns to step a8 to resume the image signal transmitting operation. If there are no image signals to be transmitted for the next page, the image signal transmitting operation is terminated. In this manner the image signals stored in the image memory 4 of the handscanner 3 can be transmitted to a remote station through the main unit 2.

In step a13, image signals are received from the handscanner 3, and in step a14, it is determined whether the received image signals are in data compression mode or not. If the signals are in data compression mode, data expansion is performed in step a15 before proceeding to step a16. If the signals are not in data compression mode, the operation jumps to step a16.

In step a16, a decision is made whether data for one line has been received or not. If the decision is YES, the operation proceeds to step a17; if NO, the operation returns to step a13.

In step a17, a recording paper feeding motor installed in the recording section 20 is driven to feed the recording paper by one line, and in step a18, one line of data is printed.

In step a19, it is determined whether printing of one page has been completed or not. If not completed, the operation returns to step a13 to continue the printing operation. When printing of one page has been completed, the printing operation is suspended, and it is determined whether the image signals for the next page have been received or not. If received, the printing operation is resumed to print the image signals; if not, the printing operation is terminated. In this manner the image signals stored in the memory 4 of the handscanner 3 are transmitted to the main unit 2 for printing on the recording paper, thus producing a duplicate image of the document read by the handscanner 3.

Figure 7:
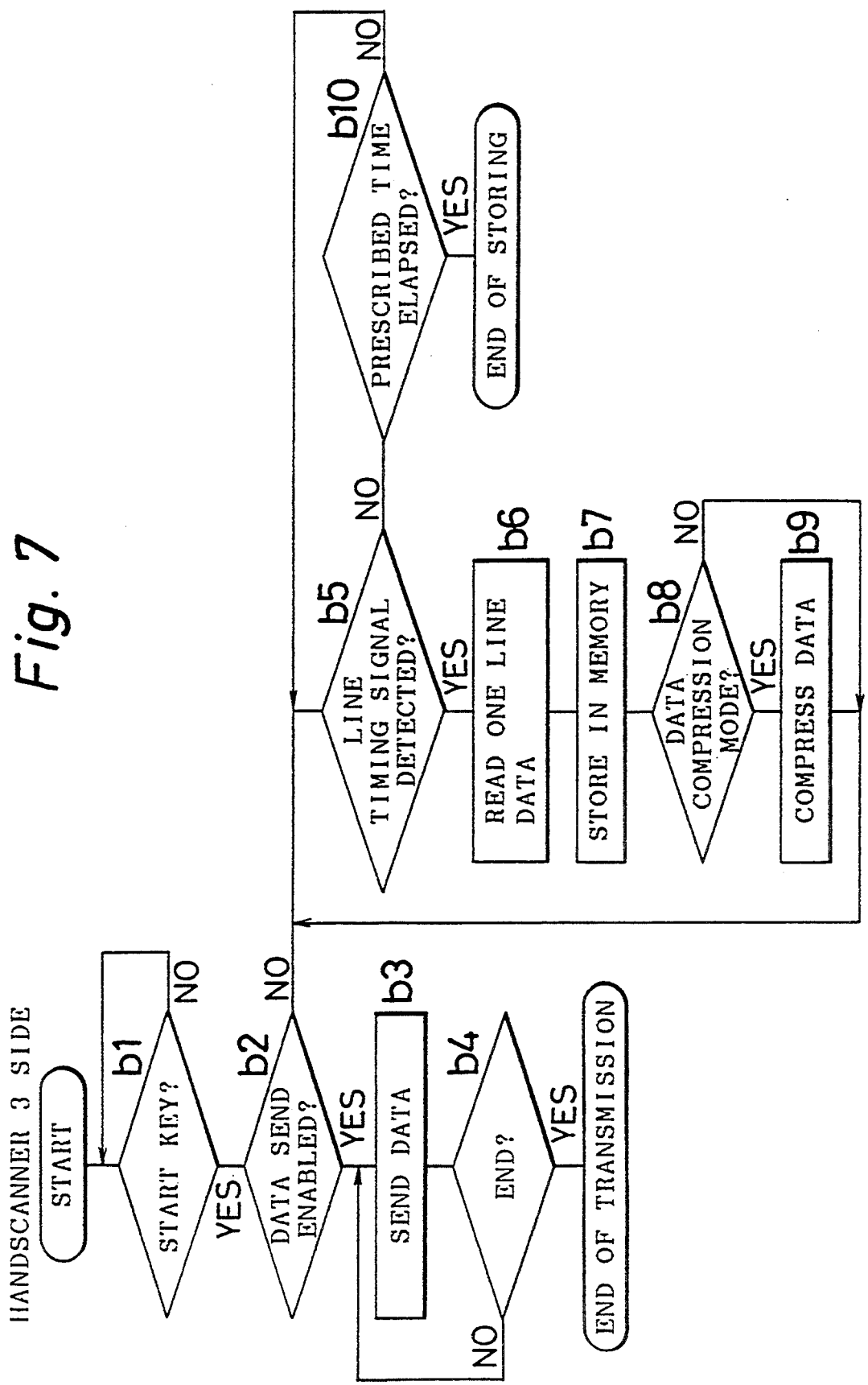
FIG. 7 is a flowchart explaining the operation of the handscanner 3.

FIG. 7 is a flowchart explaining the operation of the handscanner 3. In step b1, it is determined whether the start key on the operation section 40 of the handscanner 3 has been depressed or not. If the start key is depressed, the operation proceeds to step b2 where it is determined whether data transmission is enabled or not, i.e. whether the handscanner 3 is set for the main unit 2. As previously explained, the term "set" does not mean physical contact but means that the interfaces 5 and 6 are enabled for transmission and reception of image signals and various control signals. When data transmission is enabled, the operation proceeds to step b3; when data transmission is not enabled, the operation proceeds to step b5.

In step b3, data is transmitted to the main unit 2, and in step b4, it is determined whether the data transmission is completed or not. When the data transmission is completed, the operation is terminated. If not completed yet, the process returns to step b3 to continue the data transmission.

In step b2, if data transmission is not enabled, it is determined that the handscanner 3 is directed to read a document. That is, in step b5, a decision is made whether a line timing signal has been detected or not. If the signal is detected, the operation proceeds to step b6: if not, the operation proceeds to step b10.

In step b6, data for one line is read, and the thus read data is stored into the image memory 4 in step b7.

In step b8, it is determined whether data compression mode is set or not. When data compression mode is set, data compression is performed on the stored data, and then the operation returns to step b5. When data compression mode is not set, the operation directly returns to step b5. Thereafter, each time the line timing signal is detected, data for one line is read in the same manner as described above.

In step b10, if the line timing signal has not been detected within a preset time, the document reading operation, i.e. the image signal storing operation, is terminated.

Figure 8:
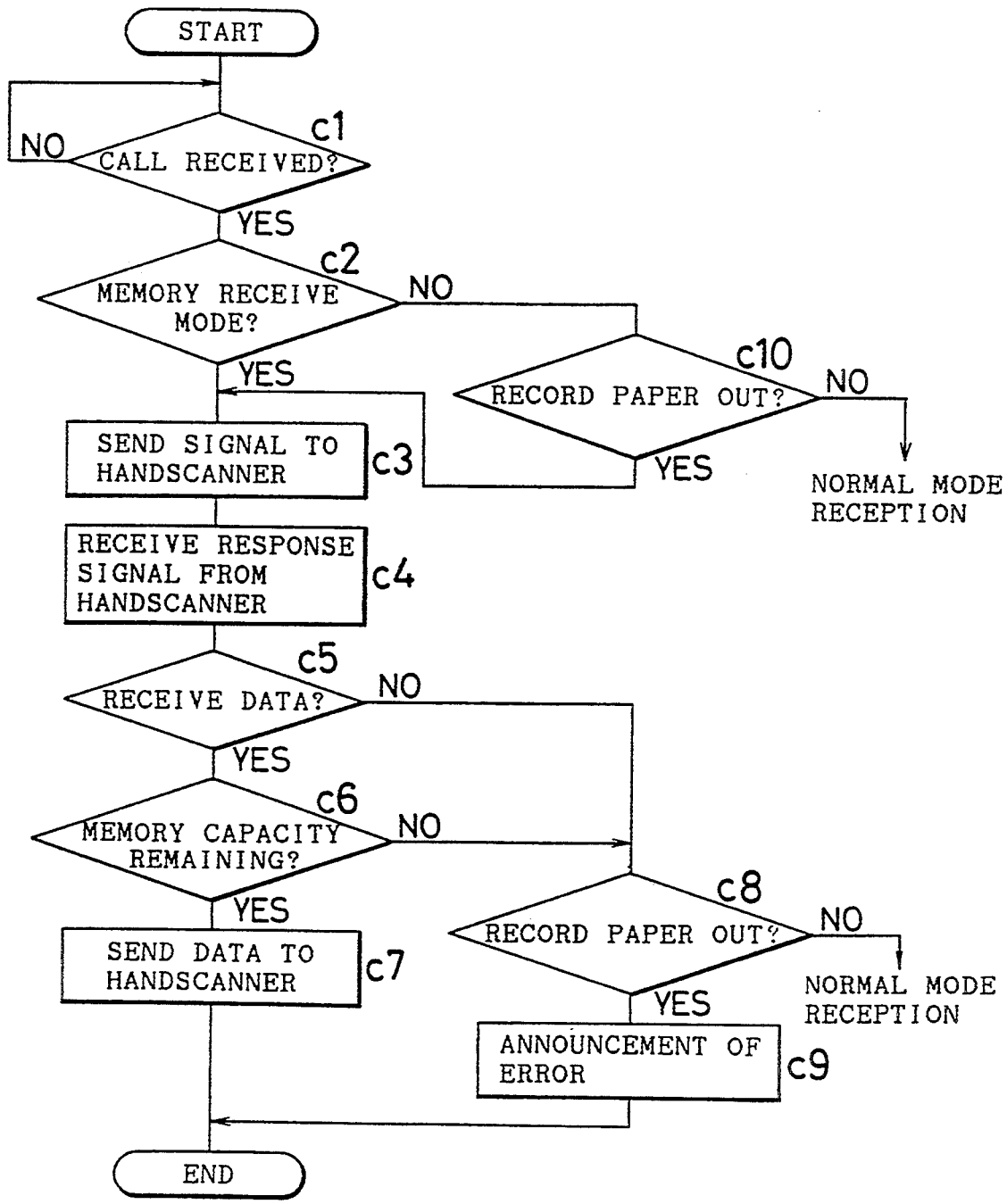
FIG. 8 is a flowchart explaining the operation of the main unit 2 during facsimile reception.

FIG. 8 is a flowchart explaining the operation of the main unit 2 during facsimile reception. When a call is received from a calling station in step c1, a decision is made in step c2 whether memory reception mode is set or not. If memory reception mode is set, the operation proceeds to step c3; if not, the operation proceeds to step c10.

In step c3, the main unit 2 sends a signal to check the conditions of the handscanner 3. This signal includes a signal to check the remaining memory amount of the image memory 4 of the handscanner 3 and the format of data stored in the image memory 4.

In step c4, a response signal is received from the handscanner 3. The response signal includes data on the remaining memory amount of the image memory 4 and information on the format of data stored therein.

In step c5, it is determined, based on the response signal, whether the data stored in the image memory 4 is receive data or not. If it is receive data, the operation proceeds to step c6; if not, the operation proceeds to c8.

In step c6, it is determined, based on the response signal, whether the image memory 4 of the handscanner 3 has a remaining memory amount. In this case, it is checked if the remaining memory amount is enough to store image signals for at least one page. When the remaining memory amount is enough, the operation proceeds to step c7; if there is not enough memory amount left, the operation proceeds to step c8.

In step c7, received image signals are transmitted to the handscanner 3 for storage in the image memory 4.

In step c8, it is determined whether or not the recording section 20 has run out of recording paper. That is, if the decision is negative in step c5 or c6, it is not possible to store received image signals into the image memory 4 of the handscanner 3, and therefore, it becomes necessary to print out the received data onto the recording paper instead of storing them in the image memory 4. Thus, when the recording paper is not out, normal receiving operation is performed. On the other hand, if the recording paper is out, the operation proceeds to step c9 to notify the operator of the occurrence of an error situation. The error may be annunciated by activating the piezoelectric buzzer 24 or by displaying an error message on a display not shown.

If, in step c2, memory reception mode is not set, it is determined in step c10 whether or not the recording section 20 has run out of recording paper. That is, when memory reception mode is not set and the recording paper is not out, normal receiving operation is performed to print out the received image onto the recording paper. When memory reception mode is not set, normal receiving operation is not possible if the recording section 20 has run out of recording paper, in which case the process proceeds to step c3 to initiate the procedure for memory reception.

As described, according to the present embodiment, the handscanner 3 is separable from the main unit 2, has the image memory 4, and transfers image signals and various control signals to and from the main unit 2 by using a technique of optical communication. Therefore, the operating range of the handscanner 3 is not limited by the length of an interconnecting cable, and thus, the operability and usefulness thereof are greatly enhanced.

Furthermore, since the hook states of the handsets 15 and 16 of the built-in telephone 15 and the external telephone 17 are detected to decide whether the image data received from the handscanner 3 should be transmitted to a remote station or should be printed out on the recording paper, there is no need to operate the keys to designate these operations. Therefore, the operability is greatly enhanced.

Moreover, the image signals received by the main unit 2 over the telephone network 7 can be transmitted, when necessary, to the handscanner 3 for storing into the image memory 4, to effectively utilize the image memory 4. That is, when a non-normal situation has occurred, for example, when the recording section 20 has run out of recording paper and therefore cannot record received data on the recording paper, then the image signals are transmitted to the image memory 4 for storage therein. The description of the present embodiment is based on the assumption that an image memory is not provided in the main unit 2, but it is apparent that the same effect as described above can be achieved if the main unit 2 is equipped with an image memory.

The main unit 2 and the handscanner 3 are coupled together by optical communication using such techniques as photoelectric conversion or light modulation. Therefore, compared with radio transmission using electric waves or the like, the configuration of the interfaces 5 and 6 can be simplified, and hence, the size and cost of the facsimile apparatus 1 can be reduced. When the light modulation technique is employed, a relatively long transmission range of about 1 meter can be achieved although the configuration becomes more or less complex. On the other hand, in the case of photoelectric conversion, the circuit configuration can be simplified although the transmission range becomes as short as several centimeters.

Figure 9:
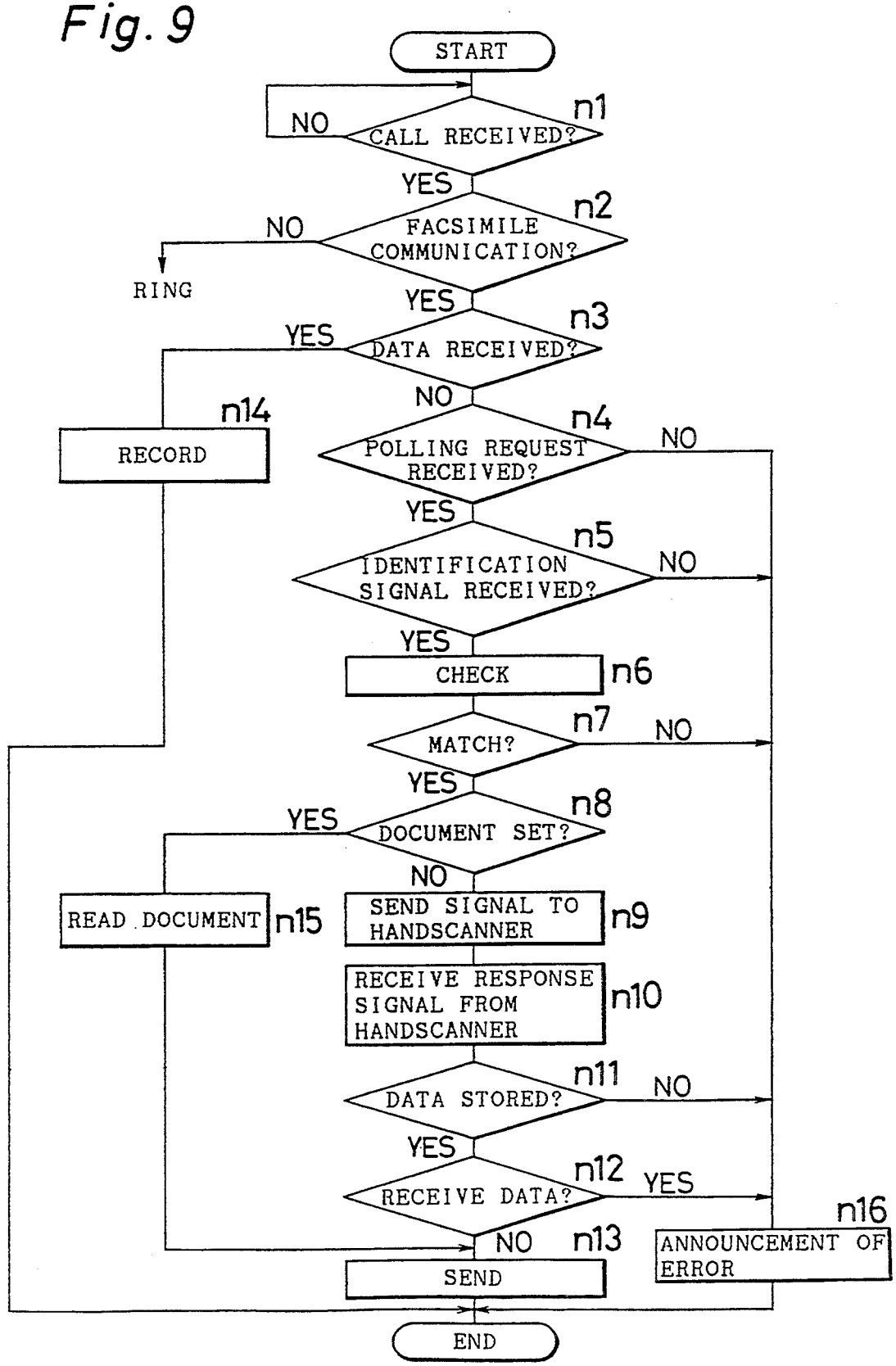
FIG. 9 is a flowchart explaining the operation of the main unit 2 in another mode.

FIG. 9 is a flowchart explaining the operation of the main unit 2 in another mode. The flowchart describes the operation when a remote terminal, the calling station, polls the facsimile apparatus 1, the called station.

When an incoming call from the calling station is detected in step n1, it is determined in step n2, based for example on the CNG signal, etc., whether the call is for facsimile communication or not. If it is for facsimile communication, the operation proceeds to step n3; if it is not for facsimile transmission, that is, if the call is for voice communication, a piezoelectric buzzer or the like installed in the main unit 2 is activated to issue a ringing tone.

In step n3, it is determined whether image data has been received or not. If no image data is received, the operation proceeds to step n4: if image data is received, the operation proceeds to step n14.

In step n4, it is determined whether or not a polling request is received from the calling station. If received, the operation proceeds to step n5; if not, the operation proceeds to step n16.

In step n5, it is determined whether or not an identification signal is received following the polling request. If received, the operation proceeds to step n6; if not, the operation proceeds to step n16.

In step n6, the received identification signal is checked against a list of passwords prestored in the main unit 2. In step n7, if there is a match, the operation proceeds to step n8, and if no match is found, the operation proceeds to step n16.

In step n8, it is determined whether a document is set in the main unit 2. If no document is set, the operation proceeds to step n9; if there is a document set in the main unit 2, the operation proceeds to step n15.

In step n9, a signal is sent to the handscanner 3 to check the memory status, and in step n10, a response signal is received from the handscanner 3. In step n11, it is determined, based on the response signal, whether any data is already stored in the image memory 4. If there is data already stored therein, the operation proceeds to step n12 where it is determined whether the stored data is send data or receive data. If it is not receive data, that is, if it is send data, the operation proceeds to step n13 to transmit the data to the remote facsimile terminal.

In step n11, if no data is stored in the image memory 4, or in step n12, if the data stored in the image memory 4 is receive data, the operation proceeds to step n16 to annunciate an error, after which the receiving operation is terminated.

In step n8, if a document is already set in the main unit 2, the document is scanned in step n15. In step n13, the scanned document, i.e. the image signal, is transmitted to the calling facsimile apparatus.

If image data is received in step n3, the operation proceeds to step n14 to print out the received image data onto the recording paper.

As described above, when a polling request is made from a remote station, if there is a password match, image signals are transmitted from the main unit 2 to the remote station. When there is a document already set in the main unit 2, the image signals to be transmitted are derived by scanning the document. When no document is set in the main unit 2, the image signals stored in the image memory of the handscanner 3 are transmitted. The facsimile apparatus 1 performs a polling transmission in this manner. This serves to enhance the usefulness of the facsimile apparatus 1 and expand the range of its applications.

Figure 10:
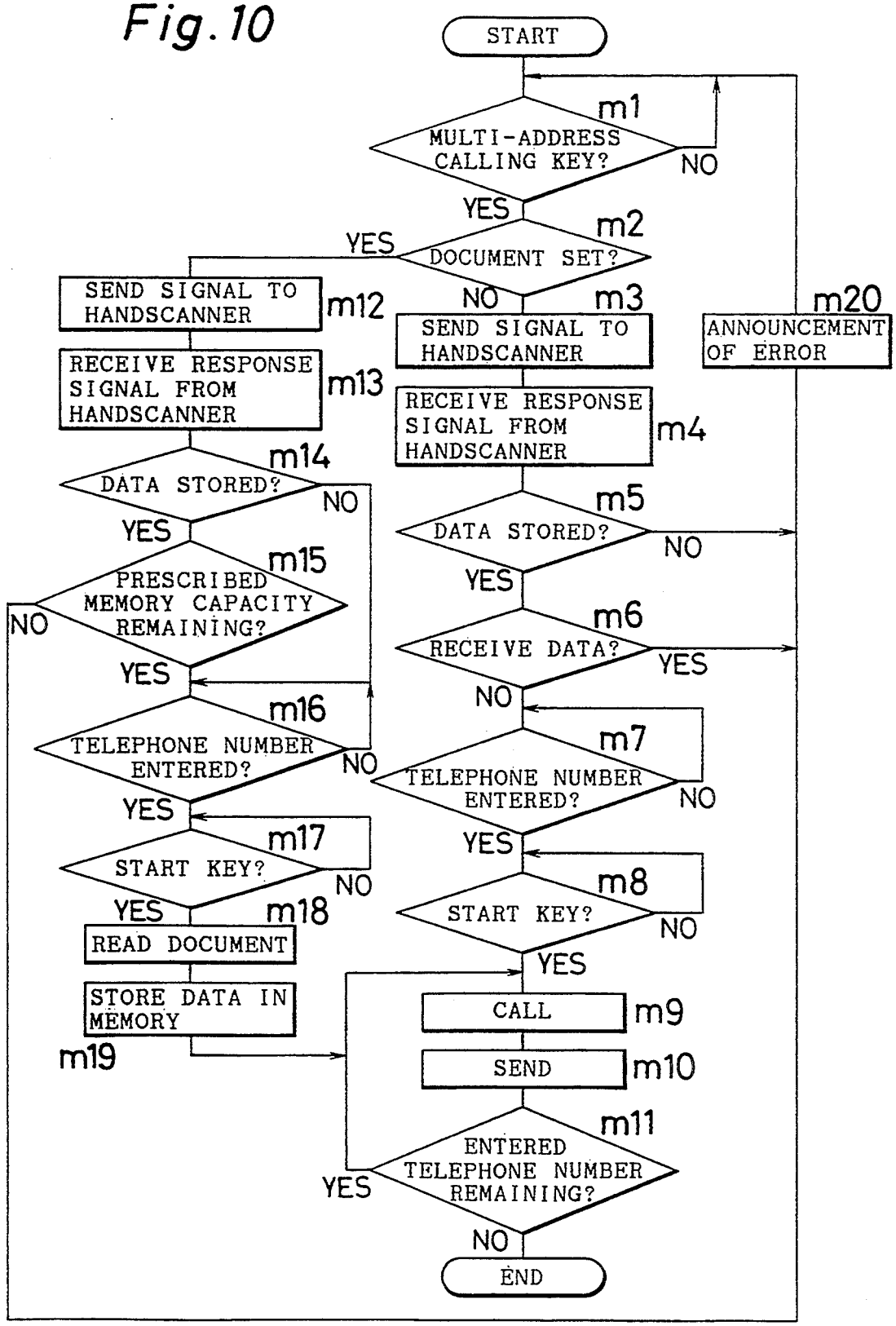
FIG. 10 is a flowchart explaining the operation of the main unit 2 in yet another mode.

FIG. 10 is a flowchart explaining the operation of the main unit 2 in yet another mode. The flowchart describes the multi-address calling operation of the facsimile apparatus 1.

When a multi-address calling key is pressed in step m1, it is determined in step m2 whether a document is set in the main unit 2. If no document is set, the operation proceeds to step m3; if a document is set, the operation proceeds to step m12.

In step m3, a signal is sent to the handscanner 3 to check the image memory status. In step m4, a response signal from the handscanner 3 is received. In step m5, it is determined, based on the response signal, whether any data is already stored in the image memory 4, and if there is data already stored therein, it is determined in step m6 whether the stored data is receive data or not. If it is not receive data, that is, if it is the image data to be transmitted, the operation proceeds to step m7.

In step m7, it is determined whether or not a telephone number is entered. The remote terminal telephone numbers to be called for the reception of multi-address calling may be manually entered one by one or may be read out of a telephone number list stored in memory. After entering telephone numbers, the operation proceeds to step m8.

When the start key is pressed in step m8, a calling operation is performed in step m9 to call each of the entered telephone numbers. In step m10, the image signals stored in the handscanner 3 are transmitted to the facsimile apparatus at each called station.

In step m11, it is determined whether there still remains any entered telephone number, that is, whether the image signals have been transmitted to all the designated stations. If not, the operation returns to step m9 to transmit the image signals to the next designated telephone number. When all transmissions have been completed, the operation is terminated.

In step m2, if a document is set in the main unit 2, the document is scanned to obtain the image signals for transmission by multi-address calling. In this case, the handscanner 3 is interrogated first to see if it has enough memory space to store the image signals.

First, in step m12, a signal is sent to the handscanner 3 to check the image memory status. In step m13, a response signal from the handscanner 3 is received. In step m14, it is determined, based on the response signal, whether any data is already stored in the image memory. If there is data already stored therein, it is determined in step m15 whether a prescribed memory space is secured or not. If not, the operation proceeds to step m20 to annunciate an error and then returns to step m1.

In step m14, if no data is stored in the image memory, or in step m15, if a prescribed memory space is left in the image memory, the operation proceeds to step m16. In step m16, it is determined, as in step m7, whether or not a telephone number is entered. After entering telephone numbers, it is determined in step m17 whether the start key is pressed. When the start key is pressed, the document set in the main unit 2 is scanned in step m18. In step m19, the image signals representing the scanned document are stored in the image memory of the handscanner 3. Thereafter, the operation proceeds to step m9 to initiate multi-address calling as described above.

As described, when image signals are stored in the handscanner 3, the image signals are transmitted by multi-address calling, and when a document is set in the main unit 2, the document image is transmitted by multi-address calling utilizing the image memory of the handscanner 3. This serves to enhance the usefulness of the facsimile apparatus 1 and expand the range of its applications.

Figure 11:
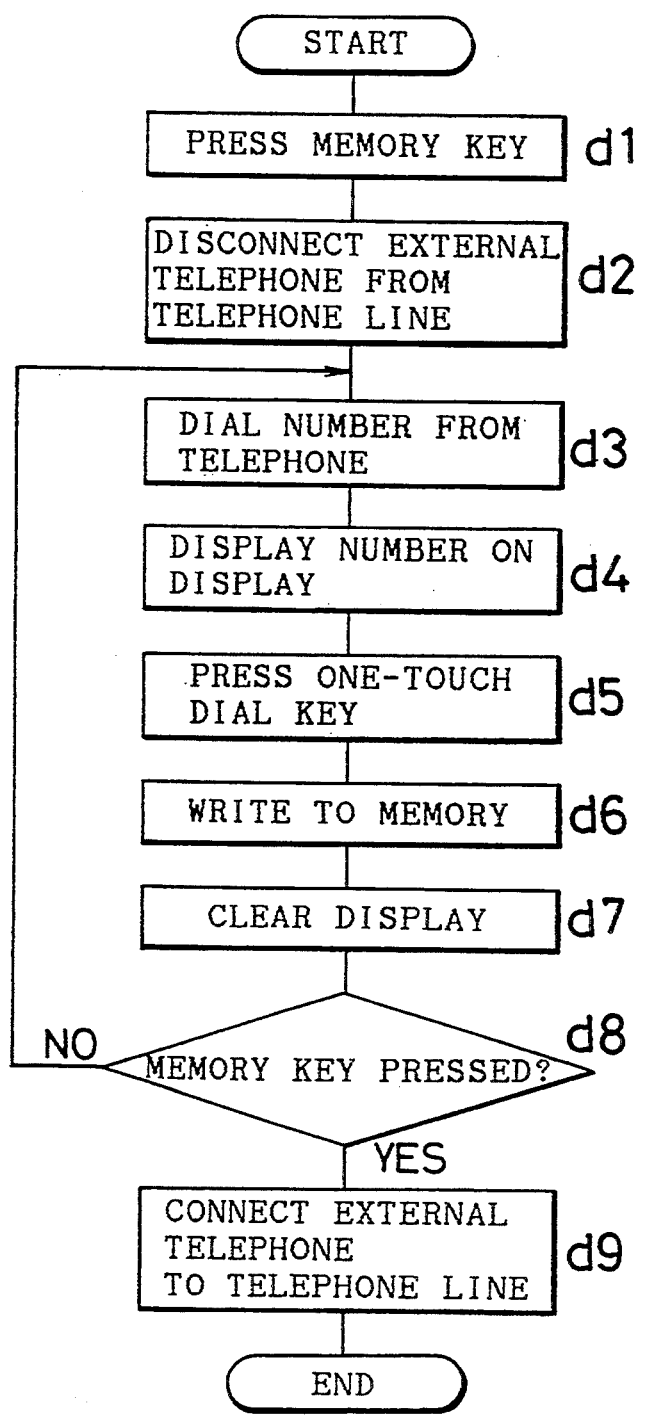
FIG. 11 is a flowchart explaining the operation for registering telephone numbers in the main unit 2.

FIG. 11 is a flowchart explaining the operation for registering telephone numbers in telephone number storage device provided in the main unit 2. When the memory key on the main unit 2 is pressed in step d1, the external telephone is disconnected from the telephone network in step d2. In step d3, a telephone number is dialed using the external telephone, the dialled number being displayed on a display of the main unit 2. The operator checks the displayed telephone number to see if the number is entered correctly.

When a quick dial key is pressed in step d5, the entered telephone number is written into the telephone number storage device in step d6. In step d7, the display is cleared.

When the memory key is pressed in step d8, the telephone number registration operation is terminated, and in step d9, the external telephone is connected to the telephone network. To continue the registration operation, the memory key is not pressed but the process is returned to step d3 to repeat the procedure for registration.

Since the external telephone can be used to register telephone numbers in the telephone number storage device, the main unit 2 need not be provided with numeric keys for registering telephone numbers, which serves to simplify the configuration of the main unit 2.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes and modifications which come within the meaning and range of equivalency of the claims are therefore intended to be embraced therein.

What is claimed is:

1. A facsimile apparatus comprising:
   a main unit including first image reading means for optically reading a document for conversion into image signals, image recording means for printing out images of the read document on recording paper, and image signal communication means for transmitting and receiving image signals over a telephone network; and
   second image reading means for optically reading a document for conversion into image signals, the second image reading means being portable,
   the second image reading means including,
   an image memory for storing the image signals of the document optically read by the second image reading means, and
   first communication means for transmitting the stored image signals to the main unit via a wireless path,
   the main unit further including,
   second communication means for receiving the image signals from the second image reading means, matching signal detecting means for detecting a predetermined matching signal received from a remote terminal over the telephone network, and control means for transferring the image signals received by the second communication means to the image signal communication means for transmission to the remote terminal when the predetermined matching signal is detected by the matching signal detecting means.

2. The facsimile apparatus of claim 1, wherein the first communication means optically transmits the stored image signals to the main unit.

3. The facsimile apparatus of claim 2, wherein the optical transmission is performed by photoelectric conversion.

4. The facsimile apparatus of claim 2, wherein the optical transmission is performed by light modulation.

5. A facsimile apparatus comprising:

a main unit including first image reading means for optically reading a document for conversion into image signals, image recording means for printing out images of the read document on recording paper, and image signal communication means for transmitting and receiving image signals over a telephone network; and second image reading means for optically reading a document for conversion into image signals, the second image reading means being portable and physically separable from the main unit, the second image reading means including, an image memory for storing the image signals of the document optically read by the second image reading means, and first communication means for optically transmitting the stored image signals to the main unit via an optical wireless path, the main unit further including, second communication means for receiving the optically transmitted image signals from the second image reading means, telephone number storage means for storing a plurality of remote terminal telephone numbers, designating means for designating multi-address calling for sequentially transmitting the received optically transmitted image signals to each of a plurality of remote terminals, and control means for sequentially calling each of the stored telephone numbers read out of the telephone number storage means, in response to the designating means, and for transferring the optically transmitted image signals received by the second communication means to the image signal communication means for multi-address calling.

6. The facsimile apparatus of claim 5, wherein, the main unit further includes an external telephone, signal detecting means for detecting one of a pushbutton dial signal and a dial pulse signal from the external telephone, and telephone number registration means for writing an entered telephone number from the external telephone to the telephone number storage means in accordance with the output of the signal detecting means.

7. The facsimile apparatus of claim 6, wherein the optical transmission is performed by photoelectric conversion.

8. The facsimile apparatus of claim 6, wherein the optical transmission is performed by light modulation.

9. The facsimile apparatus of claim 5, wherein the optical transmission is performed by photoelectric conversion.

10. The facsimile apparatus of claim 5, wherein the optical transmission is performed by light modulation.

11. A facsimile apparatus comprising:

a main unit including first image reading means for optically reading a document for conversion into image signals, image recording means for printing out images of the read document on recording paper, and image signal communication means for transmitting and receiving image signals over a telephone network; and second image reading means for optically reading a document for conversion into image signals, the second image reading means being portable and physically separable from the main unit, the second image reading means including, an image memory for storing the image signals of the document optically read by the second image reading means, and first communication means for optically transmitting the stored image signals to the main unit via an optical wireless path, the main unit further including, second communication means for receiving the optically transmitted image signals from the second image reading means, and control means for transferring the optically transmitted image signals received by the second communication means to one of the image recording means and the image signal communication means.

12. The facsimile apparatus of claim 11 wherein the first communication means of the second image reading means includes a receive function for receiving optically transmitted image signals from the main unit, the second communication means of the main unit includes a transmit function for optically transmitting image signals to the second image reading means, and the control means transmits the image signals, received through the image signal communication means, to the second image reading means for storage into the image memory when a predetermined condition is satisfied.

13. The facsimile apparatus of claim 11 or 12, wherein the main unit further includes a telephone section having a handset, and hook state detecting means for detecting whether the handset is in an on-hook or an off-hook state, and the control means transfers the image signals from the second image reading means to the image recording means when the handset is in the on-hook state, and the control means transfers the image signals from the second image reading means to the image signal communication means when the handset is in the off-hook state.

14. The facsimile apparatus of claim 11 or 12, wherein image signal transmission between the first and second communication means is performed by light modulation.

15. The facsimile apparatus of claim 11 or 12, wherein image signal transmission between the first and second communication means is performed by photoelectric conversion.

* * * * *